(No Model.)
C. O. ROCKWELL.
STRAWBERRY RUNNER CUTTER.
No. 246,207. Patented Aug. 23, 1881.
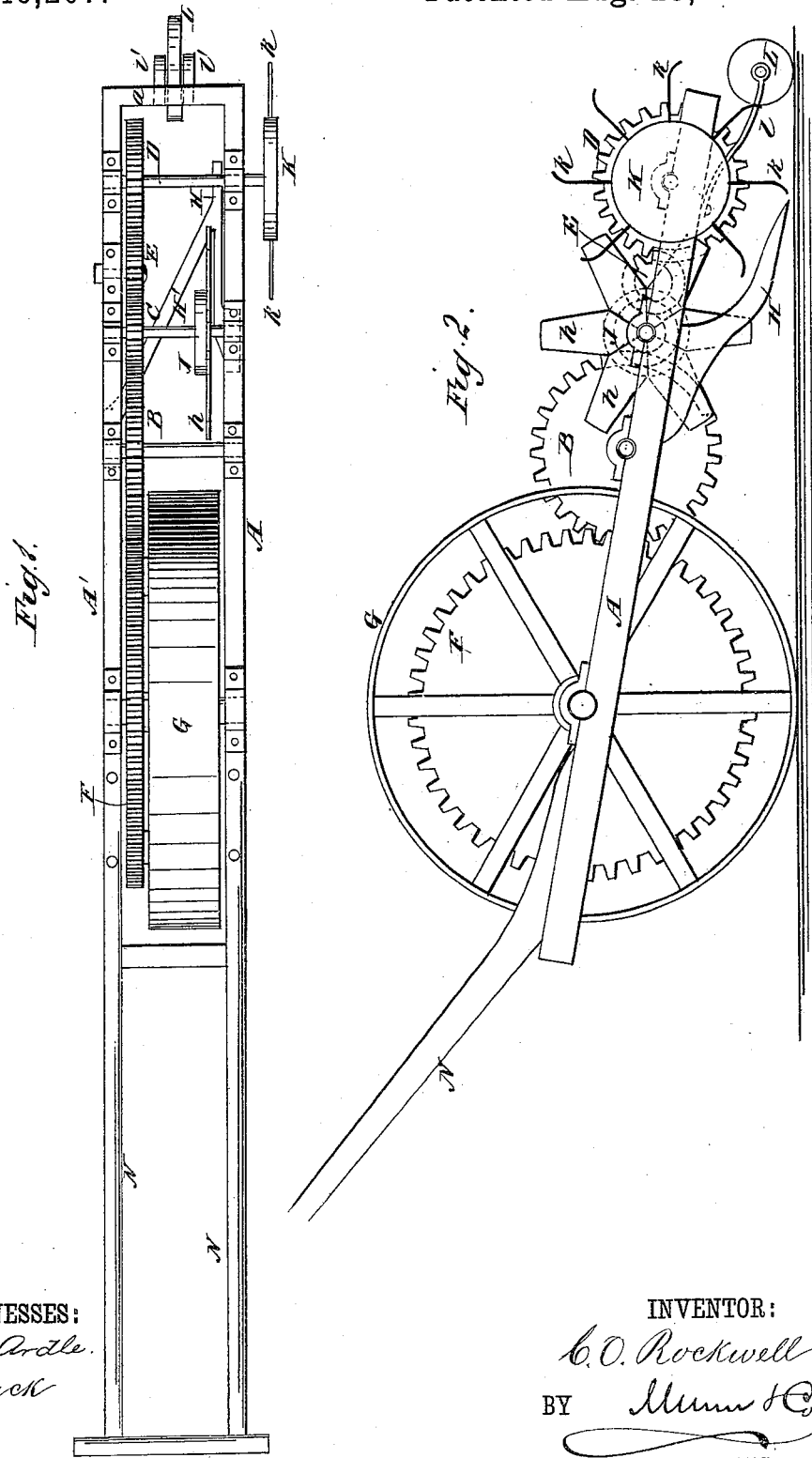
WITNESSES:
INVENTOR:
C. O. Rockwell
BY Munn & Co.
ATTORNEYS.

UNITED STATES PATENT OFFICE.

CLINTON O. ROCKWELL, OF ROARING BRANCH, PENNSYLVANIA.

STRAWBERRY-RUNNER CUTTER.

SPECIFICATION forming part of Letters Patent No. 246,207, dated August 23, 1881.

Application filed April 16, 1881. (No model.)

*To all whom it may concern:*

Be it known that I, CLINTON O. ROCKWELL, of Roaring Branch, Lycoming county, Pennsylvania, have invented a new and Improved Strawberry-Runner Cutter, of which the following is a specification.

My invention consists of a machine for cutting or pruning the runners from strawberry-vines.

In the accompanying drawings, Figure 1 is a plan view of my invention, and Fig. 2 is a side elevation thereof.

Similar letters of reference indicate corresponding parts.

The frame of the machine is composed of the parallel bars A A', of wood or any suitable material, connected by suitable cross-bars. Upon the upper side of the bars A A' are formed the bearings for the shafts of the cog-wheels B, C, and D, and upon the upper side of the bar A' is formed the bearing for the cog-wheel or idler E. These cog-wheels mesh with each other and with the cog-wheel F, which is secured to the arms or spokes of the drive-wheel G or upon the shaft thereof, which shaft is also journaled upon the upper side of the bars A A', as shown.

Upon the under side of the bar A is secured the hooked knife H, the point of which runs near the ground, and the knife is braced by the diagonal brace H', the upper end of which is secured to the under side of the bar A'.

Running contiguous to the edge of the hooked knife H are the radial blades $h$ of the revolving beater or cutting-wheel J, which is secured upon the same shaft with the cog-wheel C.

The shaft of the cog-wheel D is extended a suitable distance beyond the side of the bar A, and to the end of it, and outside the frame, is secured the wheel K, the periphery of which is provided with the hooked metal radial arms $k$ $k$, which are of such length as to reach near the ground, so that when the machine is in operation they will pick up the runners and carry them to the edge of the knife, where they will be cut off between the arms of the wheel J and the knife.

The forward end of the frame is supported by the small wheel L, which may be secured to the under side of the bars A A' by the spring-arms $l$ $l$, as shown in Fig. 2, or to the under side of the cross-piece $a$ of the frame, between the two rigid arms $l'$ $l'$, as shown in Fig. 1.

The machine is propelled over the ground, for cutting the runners, by means of the handles N N, secured to the rear end of the bars A A', as shown in Fig. 1.

I am aware that a device to run under and raise the vines has been combined with a rotary knife driven by a train of gearing from the drive-shaft; but

What I claim as new and of my invention is—

In a machine for cutting runners, the combination, with the revolving knives $h$ and hook-knife H, of the revolving wheel K, carrying forwardly end-bent arms or fingers $k$, arranged in front of the rotary knives $h$, and the hook-knife H, whereby the runners are picked up and fed to the cutters, as described.

CLINTON ORVILLE ROCKWELL.

Witnesses:
A. E. BROWNING,
J. M. BROWNING.